United States Patent [19]
d'Agostino et al.

[11] Patent Number: 4,738,597
[45] Date of Patent: Apr. 19, 1988

[54] HYDROMECHANICAL GOVERNOR

[75] Inventors: Guy d'Agostino, Vitry; André Dhainaut, Dammarie les Lys, both of France

[73] Assignee: Societe Nationale d'Etude et de Construction de Moteurs d'Aviation, Paris, France

[21] Appl. No.: 12,378

[22] Filed: Feb. 9, 1987

[30] Foreign Application Priority Data

Feb. 19, 1986 [FR] France .................... 86 02221

[51] Int. Cl.⁴ .............. F04B 49/00; F04B 49/08; F02C 9/38
[52] U.S. Cl. ........................... 417/282; 417/300; 417/294; 60/39.281
[58] Field of Search .............. 417/282, 300, 294; 60/39.281

[56] References Cited

U.S. PATENT DOCUMENTS

| | | | |
|---|---|---|---|
| 3,332,234 | 7/1967 | Lauash | 60/39.281 |
| 3,514,947 | 6/1970 | Bloom | 60/39.281 |
| 3,842,682 | 10/1974 | Bloom | 60/39.281 |
| 4,145,376 | 3/1979 | Stearns | 417/300 |
| 4,502,501 | 3/1985 | D'Agostino | 137/495 |

FOREIGN PATENT DOCUMENTS

| | | |
|---|---|---|
| 0107940 | 9/1984 | European Pat. Off. . |
| 723197 | 6/1942 | Fed. Rep. of Germany ...... 417/300 |
| 1595739 | 7/1970 | France . |
| 2180484 | 11/1973 | France . |
| 2180485 | 11/1973 | France . |
| 2528495 | 12/1983 | France . |
| 2543220 | 9/1984 | France . |
| 8103682 | 12/1981 | World Int. Prop. O. . |
| 328858 | 5/1958 | Switzerland . |

Primary Examiner—William L. Freeh
Attorney, Agent, or Firm—Oblon, Fisher, Spivak, McClelland & Maier

[57] ABSTRACT

A modular sub-assembly of a regulator of a pressure drop detector and integrated excess speed governor intended for use with turbo-machines. The pressure drop detector and the excess speed governor are supplied in parallel by a common working fluid at a common pressure PF at low flow and the excess speed governor is capable of reducing the pressure of the working fluid by placing it in communication with a pressure PB which is higher when a predetermined excess speed is achieved, in order to reduce the pressure Pmod at the outlet of the pressure drop detector and to reduce the fuel flow delivered to the injector circuit of the turbo-machine.

8 Claims, 5 Drawing Sheets

HYDROMECHANICAL GOVERNOR

BACKGROUND OF THE INVENTION

1. Field of the Invention

The present invention relates to an integrated, modular, sub-assembly for the control of a pressure drop detector and excess speed governor for turbo machines.

2. Description of the Prior Art

It is known that fuel regulators for turbo machines comprise generally, a flow dispenser of which the upstream portion is connected to the outlet of a pump and the downstream portion to an injection circuit. A regulatory valve is placed either in a branch circuit from the line between the pump and the dispenser in the case of a volumetric pump, or in series between the pump and the dispenser, or between the dispenser and the user installation in the case of a centrifugal pump. A pressure drop detector is intended to provide a modulated pressure outlet Pmod as a function of the pressure drop PAm-PAv where PAm and PAv are pressures measured upstream and downstream of the dispenser, the output pressure Pmod acting on the regulatory valve to open or close the latter when the pressure drop varies, in order to keep the pressure drop constant. An excess speed governor is capable of taking into account the rotational speed of the turbo machine for which a threshold of excess speed is fixed so as to reduce the injected fuel flow into the user installation when this threshold is exceeded in order to avoid a possible runaway of the turbo machine.

French Pat. Nos. 2 180 484, 2 180 485 and 2 180 509, are all in the name of the present applicant, and illustrate what is now a conventional way of carrying out this kind of regulation in which all the regulation functions are distributed within a voluminous hydraulic block.

Since the time of filing of the applications leading to the grant of these patents, the tendancy of engine manufacturers has been to produce modular assemblies where each module fulfils one or two functions for the regulation assembly. This modular construction enables simplification in the operations to be undertaken, and thus their cost and further to produce miniaturized modules, which contributes to achieving the objective of reduction in the volume and of the weight of the engines and their accessories.

French Pat. Nos. 2 528 495 and 2 543 220, similarly in the name of the applicants, foresee the integration of the regulatory valve within the interior of the flow dispenser in order to produce a modular sub-assembly fulfilling these two functions.

U.S. Pat. No. 3,538,707 foresees for its part the modularization of a dispenser, of a regulatory valve, of a pressurization valve and of a valve subject to excess pressure by alignment of these devices, with furthermore the integration of the excess pressure valve within the pressurization valve.

The present invention has for its object to the production of a sub-assembly integrating two regulatory functions, namely the detection of pressure drop and governing of excess speed, while producing the combination of these two functions in a common device where a fixed sleeve of the pressure drop detector serves for the location of the movable shuttle valve of the excess speed governor in order to effect miniaturization of the modular sub-assembly.

SUMMARY OF THE INVENTION

According to the present invention there is provided in a modular regulating sub-assembly a fuel reservoir, a pressure drop detector, having an outlet, an excess speed governor, both the detector and governor forming elements of a turbo-machine regulator sub-assembly, a fuel flow dispenser having an inlet and an outlet, a pump having an outlet, means communicating the outlet of the pump with the inlet of the dispenser, the fuel delivered to the dispenser being at a pressure PAm and the fuel dispensed being at a pressure PAv for supply to an injector circuit of a turbo-machine, means for supplying a working fluid at a common pressure PF under low load conditions in parallel to the pressure drop detector and the excess speed governor, and a control valve, the arrangement being such that the pressure drop detector is capable of detecting variations in the pressures PAm and PAv under the action of the working fluid at pressure PF so as to deliver the working fluid at a pressure Pmod as a function of the pressure drop PAm-PAv to said control valve which is adapted to act on the fuel flow in order to maintain constant said pressure drop, the excess speed governor being capable of detecting the rotational speed of the turbo-machine driving it and of reducing under the action of the working fluid, the fuel flow to the injector circuit in response to a pre-set rotational speed threshold being exceeded, and the excess speed governor further being capable of reducing the pressure of the working fluid by subjecting it to a pressure PB which is lower when the pre-set threshold is achieved in order to reduce the pressure Pmod at the outlet of the pressure drop detector and thereby to reduce the fuel flow delivered to the injector circuit.

The working fluid pressure PF acting in parallel on the pressure drop detector and the excess speed governor is preferably constituted by fuel bled at low flow downstream of the pump through a diaphragm, and the low pressure PB is preferably located at any point of the fuel circuit between the fuel tank and upstream of the pump.

In the text which follows, the term "the tank" will be used to designate that part of the fuel circuit which is at low pressure.

According to one characteristic of the invention, the pressure drop detector is constituted by a cylindrical sleeve movable in translation and in rotation between an external radial casing and an internal radial sleeve which is fixed and defining two control chambers respectively the one at the pressure PAm and the other at the pressure PAv and two working chambers, the one at the pressure PF and the other in communication with the fuel tank at pressure PB and capable by its translational displacements to place in communication one outlet opening, either with the first working chamber at pressure PF or with the second working chamber at pressure PB in order to provide the outlet pressure Pmod, and in response to a reduction, or respectively an increase in the ppressure drop PAm-PAv.

According to another characteristic of the invention, the excess speed governor is constituted by a shuttle valve movable in translation, within the internal sleeve of the pressure drop detector, under the action of masses sensitive to the rotational speed of the drive system; the internal sleeve comprises two radial openings discharging respectively each into one of the working chambers of the pressure drop detector, and the shuttle valve comprises An intermediate annular chamber closed by two enlargements, one of the enlargements of the shuttle valve being capable of closing one of the radial openings of the fixed sleeve while the excess speed threshold is not reached and to disengage from this opening in order to place in communication the two working chambers of the pressure drop detector, the one with the other through openings of the sleeve and of the intermediate chamber of the shuttle valve as soon as the excess speed threshold is reached.

According to a preferred embodiment of the invention, the regulatory sub-assembly comprises:

1. A casing provided with a cylindrical bore into which five passages discharge radially successively along the longitudinal axis of the bore, the first receiving fuel from the upstream of the dispenser at the pressure PAm, the second receiving fuel from downstream of the dispenser at the pressure PAv, the third being in communication with the fuel tank at pressure PB, the fourth delivering the working fluid to the regulatory valve at pressure Pmod and the fifth receiving the working fluid at the pressure PF;

2. A cylindrical sleeve movable in translation and in rotation within the casing, comprising an internal cylindrical bore and five annular external chambers corresponding with the passages of the casing, each chamber comprising radial openings for placing it in communication with the cylindrical internal bores;

3. A fixed sleeve comprising an internal bore and defining with the movable sleeve, on the one hand two control chambers separated by a first land and communicating respectively with the first and the second passage of the casing through the intermediary of radial openings and of annular chambers of the sleeve, on the other hand two working chambers separated by a second land of the sleeve, communicating respectively with the third and the fifth passage of the casing through openings and the chambers of the sleeve, the second land being capable of mAsking or of disengaging the opening of the sleeve communicating with the fourth passage of the casing as a function of the displacements of the sleeve, movable under the action of relative pressures PAm and PAv within two control chambers, each working chamber of the sleeve comprising a radial opening discharging into the internal bore of the said sleeve;

4. A central shuttle valve movable in translation within the central bore of the fixed sleeve forming with the said sleeve an intermediate chamber defined by two lands or enlargements of the shuttle valve, the said intermediate chamber being connected to the working chamber at pressure PB through the corresponding opening and the lands being capable of closing the opening to the working chamber at pressure PF and opening it as soon as the displacement of the shuttle valve exceeds the excess speed threshold.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENTS

Figure 1:
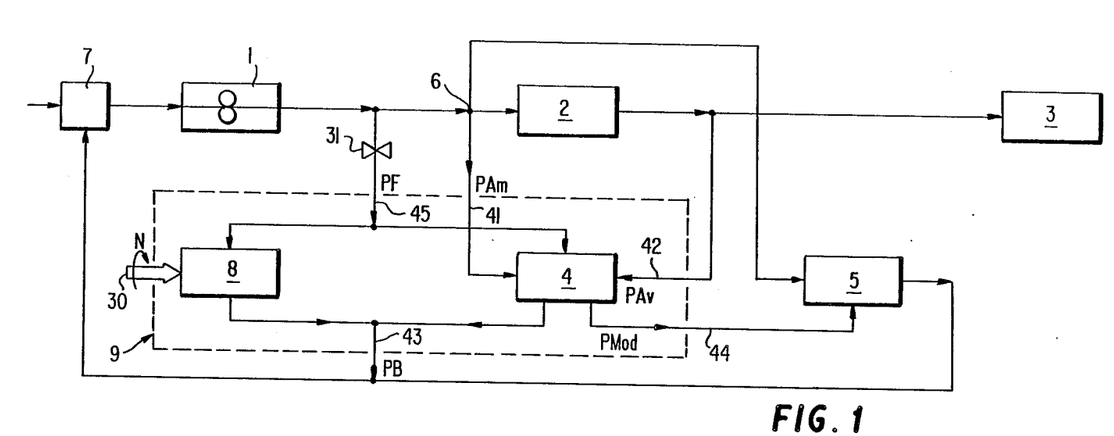
FIG. 1 is a functional diagram for the regulation of fuel with a volumetric pump which is integrated with a sub-assembly according to the invention.

A diagram of a fuel regulator for a turbo machine with a volumetric (or positive displacement) pump is illustrated in FIG. 1. The installation comprises a volumetric pump 1 which supplies a constant volume to a dispenser 2 which supplies the injection circuit 3, here constituted by the injectors of a combustion chamber (or chambers) of a turbo-machine. A pressure drop detector 4 receives through two inlet pipes 41 and 42 pressure signals PAm from upstream of the dispenser 2 and PAv from downstream of the dispenser and, under the action of a working fluid at pressure PF, supplies fluid at the outlet passage 44 at a pressure Pmod which controls the opening and the closure of a valve 5 of which the inlet is connected at a point 6 situated between the pump 1 and the dispenser 2, and the outlet of a fuel tank 7.

The role of the regulatory valve 5 is, in response to the detection of a variation in the pressure drop equal to the difference PAm-PAv, to determine the fuel excess which lies between the pump 1 and the dispenser 2 in order to maintain constant the pressure drop in the dispenser, which constitutes a condition such that the supply of fuel of the injectors, which is proportional to the cross-section of the passage of the dispenser and to the square root of the pressure drop, varied only by displacements of the piston of the dispenser.

An excess speed governor 8 receiving signals related to the rotational speed N of the turbo machine which drives it, is called upon to reduce the flow in the injection circuit 3, when an excess speed threshold is reached in order to bring the rotational speed system back to its nominal valve, in accordance with an operational mode which will be given in further detail hereinafter.

The invention relates to an embodiment of the referenced module 9 comprising the pressure drop detector 4 and the excess speed governor 8 and the inlet passages and outlet passages respectively for the fuel.

Figure 2:
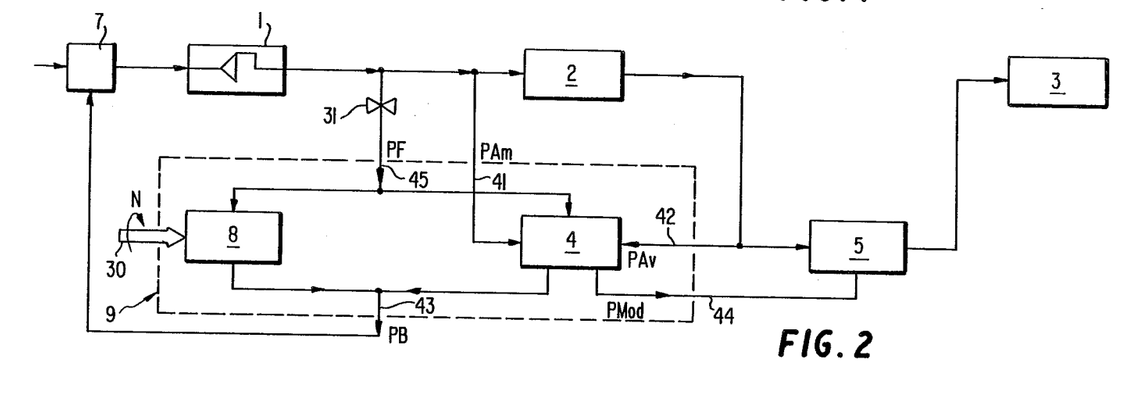
FIG. 2 illustrates the integration of the sub-assembly in the regulator together with a centrifugal pump.

In FIG. 2, a diagram of the fuel regulation unit has been shown for a turbo machine with a centrifugal pump, identical integers to those of FIG. 1 having been given the same reference numerals.

In this embodiments, the pump 1 employed is of the centrifugral type and delivers fuel at a pressure approximately independent of the flow. The maintenance of the pressure drop constant within the dispenser 2 is effected then by disposing the regulatory valve in series with the dispenser so as to create a supplementary throttle which enables action on the upstream or downstream pressure of the dispenser in order to re-establish, in response to a variation, the pressure drop to its predetermdined value. The modular sub-assembly 9 according to the invention is integrated in this arrangement in the same manner as in the first embodiment.

Figure 3:
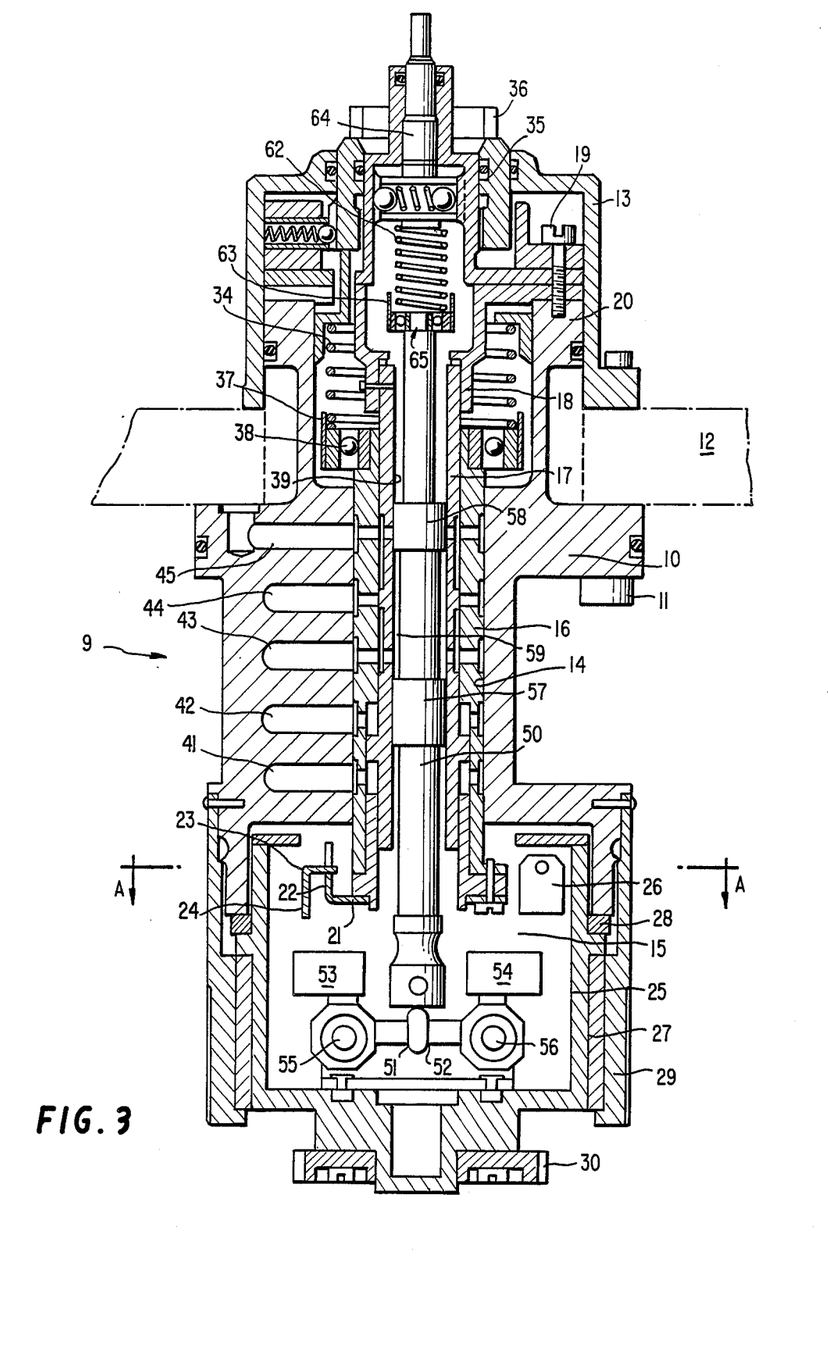
FIG. 3 illustrates in axial section a sub-assembly in accordance with the invention.
Figure 4:
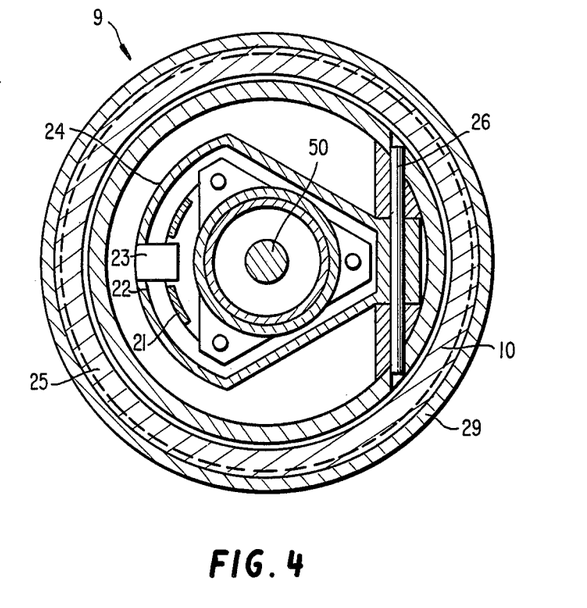
FIG. 4 is a cross-section on line A—A of FIG. 3.
Figure 5:
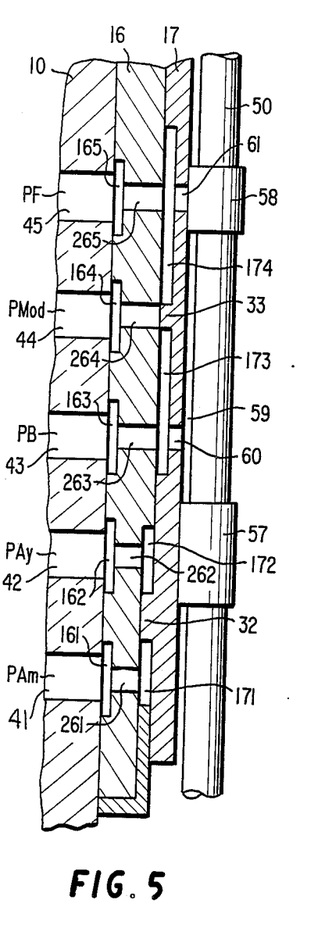
FIG. 5 illustrates in axial section a detail of the respective positions of the various members of the sub-assembly according to the invention, corresponding to a stabilized pressure drop and at a nominal rotational speed.
Figure 6:
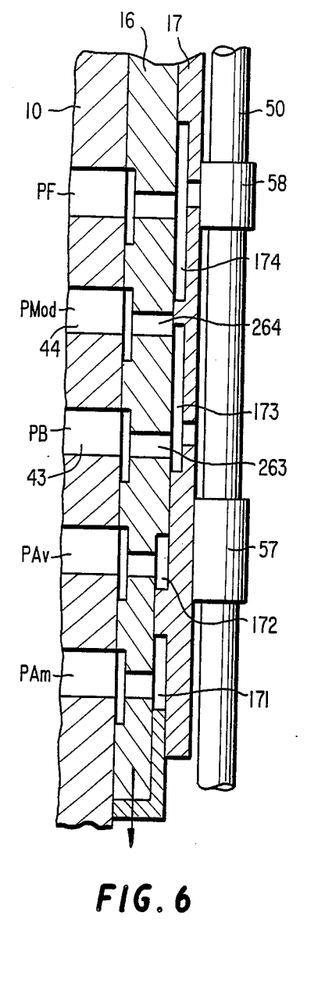
FIG. 6 shows the same detail during an increase in the pressure drop.
Figure 7:
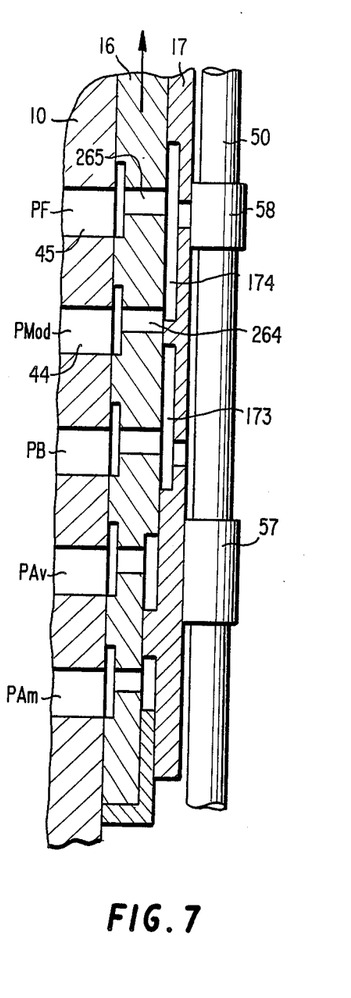
FIG. 7 is a similar view to that of FIG. 6 during a reduction in the pressure drop.

If one now refers to FIGS. 3 and 4 which show the sub-assembly 9, it will be seen that the latter comprises an external casing 10 secured by bolts 11 on to the structure 12 of the regulator with which it is associated. The casing 10 is closed on the outside of the structure 12 by a cap 13 closing in the regulatory means for the pressure drop and of the excess speed threshold as will be apparent from the description given hereinafter.

The casing 10 comprises a cylindrical bore 14 opening at its lower part into a cylindrical chamber 15 containing means for driving the pressure drop detector and the excess speed governor slide valve.

In the bore 14 a tubular movable sleeve 16 is present between the casing and a fixed sleeve 17 rigid with the higher part of a hollow tubular member 18 screwed at 19 on to an upper cylindrical seating 20 of the casing 10.

The movable sleeve is rigid at its lower part with a cup-like member 21 having an oblong opening 22 receiving the lug 23 of a sector-like member 24 rotatably mounted in a hollow cylinder 25 by means of a pin 26. The hollow cylinder 25 is itself rotatable about the central axis of the bore 14 on carbon bearings 27,28 disposed within a screw threaded ring 29 closing the lower chamber 15, the cylinder 25 being rotated by a toothed wheel 30 meshing with a drive system, not illustrated to the Figure.

The casing 10 comprises (see FIGS. 3 and 5 to 8) five passages discharging into the bore 14, the passages being connected, when the sub-assembly is mounted on the regulatory assembly:

The first passage 41 upstream of the dispenser, at the pressure PAm;

The second passage 42 downstream of the dispenser, at the pressure PAv;

The third passage 43 connected to the fuel tank 7 at the pressure PB;

The fourth passage 44 arranged as will be seen for receiving the fuel at the pressure Pmod at the inlet of the control of the regulatory valve 5; and The fifth passage 45 is connected to a source of working fluid pressure PF, this source being capable in a simple manner of being supplied with fuel in the regulatory circuit between the pump 1 and the dispenser 2, provided with a closure at 31 in order to reduce the flow in the passage 45, as illustrated in FIGS. 1 and 2.

The movable sleeve 16 comprises five annular outer chambers 161 to 165 corresponding to the five passages 41 to 45, and at each chamber, radial openings 261 to 265 discharge into the internal bore of the sleeve, containing the fixed sleeve 17.

The sleeve 17 itself comprises two annular external control chambers, separated by a land 32 of the sleeve, the one 171 and the other 172 being in constant communication respectively with the inlet 41 at pressure PAm and 42 at the pressure PAv.

The sleeve 17 also comprises two annular external working chambers 173 and 174 separated by a second land 33, these chambers being in constant communication respectively with the fuel tank 7 through the passage 43 at pressure PB and with the inlet 45 at the pressure PF. The land 33 can mask or unmask the radial opening 264 which communicates with the outlet 44.

The casing 10, the movable sleeve 16 and the fixed sleeve 17 form the pressure drop detector, the sleeve 16 being displaced in translation i.e. rectilinearly under the action of the differential pressure PAm-PAv within chambers 171 and 172 and supply the modulated pressure Pmod to the outlet 44 by means of a mixture of pressure fluids PF and PB during oscillations of the land 33 about its means position on the face of the opening 264.

The control of the pressure drop is effected by means of a resilient member comprising a spring 34 compressed between a regulatory device with a screw thread 35 and a nut 36 and a ring 37 rigid with a ring arranged externally of a ball bearing 38 of which the inner race is securely locked on the upper end of the sleeve 16.

The excess speed governor 8 comprises a shuttle valve member 50 movable in translation i.e. rectilinearly within a bore 39 of the sleeve 17. The shuttle valve member 50 is actuated in translation by two rollers 51,52 rigid with two masses 53,54 pivoted on two pins 55,56 carried by a part rigid with the cylinder 25.

The shuttle valve member 50 comprises two enlargements 57,58 defining with the fixed sleeve 17 an intermediate chamber 59 in constant communication with the pressure PB of the fuel tank 7 through an opening 60 of the sleeve 17 discharging into the chamber 173. The enlargement 58, in itself, masks at normal rotational speeds of the system the activation of an opening 61 of the sleeve 17, discharging into the chamber 174 at the pressure PF.

The excess speed threshold is pre-set by an adjustable resilient abutment or stop which serves to displace the shuttle valve 50 on contact therewith under the action of the masses 53,54.

This abutment comprises a spring 62 compressed between a cup 63 (against which it is applied by means of a roller bearing 65 to the upper end of the shuttle valve 50) and an adjustment screw 64.

The operation of the assembly combining the pressure drop detector and the excess speed governor is as follows:

When the pump 1 is of the volumetric type, which is the case in FIG. 1, the regulatory valve 5 must open when the pressure drop PAm-PAv increases, in order to divert a part of the fuel flow delivered by the pump 1 and to re-establish the pressure drop to its nominal value by reducing PAm.

The following description assumes this case. At normal speeds of rotation of the drive system and for the nominal pressure drop, the movable sleeve takes up the configuration shown in FIG. 5 and the enlargement 58 of the slide valve 50 masks the opening 61 of the sleeve.

When the pressure PAm upstream of the dispenser 2 increases (FIG. 6), the pressure drop PAm-PAv increases: the excess pressure in the chamber 171 tends to displace the movable sleeve 16 towards the bottom in the Figure, thus unmasking the opening 264 and placing the outlet 44 in communication with the fuel tank through the intermediary of the chamber 173. The pressure Pmod being thus reduced, the regulatory valve 5 opens, which has the effect of discharging the pressure PAm.

Conversely (FIG. 7), if it is the pressure PAv downstream of the dispenser which increases, the sleeve 16 will be moved upwardly in the Figure and the outlet 44 will be placed in communication with the chamber 174 at the pressure PF, which has as its action to close the valve 5 and this will lead to an increase in the downstream pressure PAm thus re-establishing the initial pressure drop PAm-PAv.

Figure 8:
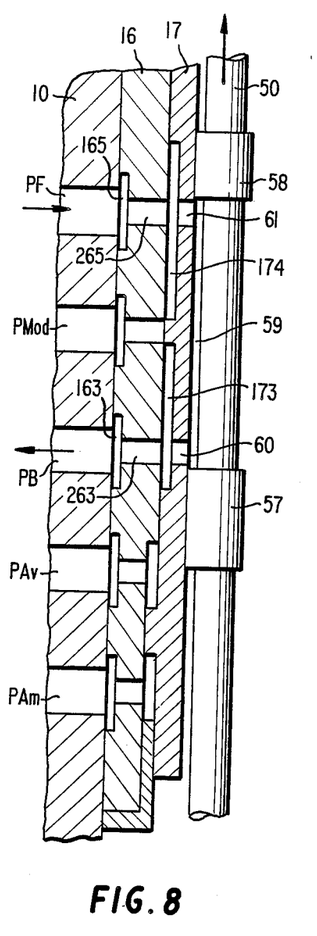
FIG. 8 is a similar view of that of FIG. 7 but which shows the functioning of an excess speed governor when the excess speed threhold is exceeded.

When the pressure drop is substantially constant but the excess speed threshold is exceeded, the parts with be found as in the configuration of FIG. 8. The shuttle valve 50 is displaced upwardly by the rollers 51,52 and the enlargement 58 unmasks the opening 61 of the fixed sleeve thus placing the chambers 163 and 163 in communication with one another through the intermediary of the working chambers 173,174 openings 60 and 61 and the intermediate chamber 59. The working pressure PF is thus discharged towards the fuel tank 7 which serves to reduce the output pressure Pmod of the pressure drop detector and by the same means rapidly to open the regulatory valve 5 and thus to reduce the flow into the receiving installation 3, thus leading to a reduction in the rating. The rotational speed thus returns to its normal range of values.

When the pump is of the centrifugal type, as is illustrated in FIG. 2, on the contrary the regulatory valve 5 must be closed when the pressure drop PAm-PAv increases, in order once again to throttle the fuel flow passing through the dispenser 2 and to re-establish the pressure drop to its nominal value either by reducing PAm or by increasing PAv depending upon whether the regulatory valve 5 is placed upstream or downstream of the dispenser 2.

In this case, the device hereinbefore described operates in the same manner but the sense of control of the regulatory valve is inverted so that a reduction of Pmod gives rise to closure of the regulatory valve and an increase of Pmod gives rise to an opening of the regulatory valve.

The device according to the invention thus enables the integration of an excess speed governor within a pressure drop detector, in order to obtain an amplification effect of the control of reduction in the excess speed by acting directly on the hydraulic supply of the pressure drop detector. This amplification of control enables the production of a detector of small volume and enables, in addition, rapidity in the necessary operation of a safety device of this type.

Furthermore, the integration of the shuttle valve of the governor within the sleeve of the pressure drop detector is important for the miniaturization of the module as the excess speed governor uses the same pressures for working fluid PF and PB as the pressure drop detector.

Obviously, numerous modifications and variations of the present invention are possible in light of the above teachings. It is therefore to be understood that within the scope of the appended claims, the invention may be practiced otherwise than as specifically described herein.

What is claimed is:
1. In a modular regulating subassembly
 a fuel reservoir,
 a pressure drop detector, having an outlet,
 an excess speed governor, wherein both the detector and governor form elements of a turbo-machine regulator sub-assembly,
 a fuel flow dispenser having an inlet and an outlet,
 a pump having an output,
 means communicating the outlet of the pump with the inlet of the dispenser, the fuel delivered to the dispenser being at a pressure PAm and the fuel dispensed being at a pressure PAv for supply to an injector circuit of a turbo-machine,
 means for supplying a working fluid at a common pressure PF under low load conditions in parallel to the pressure drop detector and the excess speed governor, and
 a contral valve,
 wherein the pressure drop detector is adapted for detecting variations in the pressures PAm and PAv under the action of the working fluid at pressure PF so as to deliver the working fluid at a pressure Pmod as a function of the pressure drop PAm-PAv to said control valve which is adapted to act on the fuel flow in order to maintain constant said pressure drop, the excess speed governor being adapted for detecting the rotational speed of the turbo-machine driving it and for reducing under the action of the working fluid, the fuel flow to the injector circuit in response to a pre-set rotational speed threshold being exceeded,
 the excess speed governor further being adapted for reducing the pressure of the working fluid by subjecting it to a pressure PB which is lower when the pre-set threshold is achieved in order to reduce the pressure Pmod at the outlet of the pressure drop detector and thereby to reduce the fuel flow delivered to the injector circuit; and
 a throttle wherein the working fluid at pressure PF supplied in parallel to the pressure drop detector and the excess speed governor is fuel bled at low flow downstream of the pump through the throttle, and the low pressure PB is derived from any point of the fuel circuit between the fuel reservoir and upstream of the pump and wherein the pressure drop detector comprises a cylindrical sleeve movable rectilinearly and in rotation, a casing positioned radially outwardly of the sleeve, and a fixed sleeve positioned radially inwardly of the cylidnrical sleeve, defining two control chambers, one being at the pressure PAm and the other being at the pressure PAv and two working fluid chambers, one being at the pressure PF and the other being in communication with the tank at pressure PB and being adapted by its rectilinear displacement of placing in communication an outlet opening selectively either with the first working chamber at pressure PF, or with the second working chamber at pressure PB in order to produce said outlet pressure Pmod, in response to a reduction, or selectively an increase in a pressure drop PAm-PAv.

2. A sub-assembly according to claim 1, wherein the excess speed governor comprises a shuttle valve movable rectilinearly within the fixed sleeve of the pressure drop detector, masses sensitive to the rotational speed of a drive system and is adapted for moving the shuttle valve rectilinearly, wherein the inner sleeve comprises two radial openings respectively discharging into each of the working chambers of the pressure drop detector, and wherein the shuttle valve comprises two enlargements spaced along its length defining an annular intermediate chamber, one of the enlargements of the shuttle valve being adapted for closing the one of the radial openings of the fixed sleeve as long as said excess speed threshold is not achieved and to uncover this opening for placing in communication the two working chambers of the pressure drop detector, the one with the other through said radial openings of the fixed sleeve and of the intermediate chamber of the shuttle valve as soon as the excess speed threshold is reached.

3. A sub-assembly according to claim 1 comprising:

a casing provided with a cylindrical bore into which can be discharge radially five passages successively along the longitudinal axis of the bore, the first passage receiving fuel from upstream of the dispenser at the pressure PAm, the second passage receiving fuel from downstream of the dispenser at the pressure PAv, the third passage being in communication with the low pressure tank at pressure PB, the fourth passage discharging to the control valve the working fluid at the pressure Pmod and the fifth passage receiving the working fluid at the pressure PF;

a cylindrical sleeve movable rectilinearly and in rotation within the casing, and comprising an internal cylindrical bore and the five annular external chambers corresponding with the passages of the casing, each chamber comprising radial openings for communication with the internal cylindrical bore;

a fixed sleeve comprising an internal bore and defining with the movable sleeve two control chambers separated by a land and respectively communicating with the first and the second passage of the casing through the intermediary of radial openings and of annular chambers, of the sleeve, and also defining two working chambers separated by a second land of the sleeve, respectively communicating with the third and the fifth passage of the casing through the openings and the chambers of the sleeve, the second land being adapted for masking or unmasking the opening of sleeve communicating with the fourth passage of the casing as a function of the displacements of the movable sleeve under the action of relative pressures PAm and PAv of the two control chambers; each working chamber of the sleeve comprising a radial opening discharging into the internal bore of the said sleeve; and a central shuttle valve, movable rectilinearly within the central bore of the fixed sleeve, forming with said sleeve an intermediate chamber defined by two lands of the shuttle valve, said intermediate chamber being connected to the working chamber at pressure PB through the corresponding opening and one of the lands being adapted for closing the opening towards the working chamber at pressure PF and to open it as soon as the displacement of the shuttle valve exceeds the excess speed threshold.

4. A sub-assembly according to claim 3, comprising a spring abutment, the sleeve being movable on contact with the spring abutment adjustable by screw means.

5. A sub-assembly according to claim 4 comprising a drive system, a hollow cylinder member, a ring rigid with the said casing, a sector shaped member having a lug and a cup-like member rigid with the sleeve, and having a notch, the arrangement being such that the sleeve is rotated by the drive system, the cylinder member being rotatably mounted within the ring and transmitting the rotation of the drive system to the sleeve by means of the sector carrying the lug which cooperates with the notch of the cup-like member.

6. A sub-assembly according to claim 5, wherein the notch of the cup-like member is oblong in order to enable displacements axially of the sleeve within the internal bore of the casing.

7. A sub-assembly according to one of claims 5 comprising rollers in contact with one end of the shuttle valve, masses acting on the rollers and pivotal on pins, a part rigid with a base of the cylinder member receiving said pins, the shuttle valve of the excess speed governor being driven rectilinearly by said rollers.

8. A sub-assembly according to claim 7, comprising a resilient abutment, and means for adjusting the stiffness of the spring dependent upon the pre-set excess speed threshold required the shuttle valve of the excess speed governor being movable rectilinearly by contact with the resilient abutment.

* * * * *